(12) United States Patent
Matsuda

(10) Patent No.: US 7,417,643 B2
(45) Date of Patent: Aug. 26, 2008

(54) IMAGE PROCESSING SYSTEM, PROJECTOR, STORAGE MEDIUM, AND IMAGE PROCESSING METHOD

(75) Inventor: Hideki Matsuda, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/802,398

(22) Filed: May 22, 2007

(65) Prior Publication Data

US 2007/0222792 A1 Sep. 27, 2007

Related U.S. Application Data

(60) Continuation of application No. 11/372,262, filed on Mar. 10, 2006, now Pat. No. 7,245,307, which is a division of application No. 10/843,530, filed on May 12, 2004, now Pat. No. 7,061,506.

(30) Foreign Application Priority Data

May 16, 2003 (JP) .............................. 2003-138173
May 28, 2003 (JP) .............................. 2003-150850

(51) Int. Cl.
*G09G 5/02* (2006.01)
(52) U.S. Cl. ..................... 345/600; 345/603; 345/604
(58) Field of Classification Search ................ 345/600, 345/603–605; 382/167
See application file for complete search history.

(56) References Cited

U.S. PATENT DOCUMENTS 6,765,585 B2 7/2004 Wada
6,927,784 B2 8/2005 Matsuda et al.
2002/0154138 A1 10/2002 Wada et al.
2004/0212783 A1* 10/2004 Wada .......................... 353/31

FOREIGN PATENT DOCUMENTS

| CN | 1410872 A | 4/2003 |
|---|---|---|
| EP | 0 562 974 A1 | 9/1993 |
| EP | 0 989 757 A1 | 3/2000 |
| EP | 1 223 753 A2 | 7/2002 |
| JP | A 06-217242 | 8/1994 |

(Continued)

*Primary Examiner*—Kee M. Tung
*Assistant Examiner*—Kevin K Xu
(74) *Attorney, Agent, or Firm*—Oliff & Berridge, PLC

(57) ABSTRACT

In order to provide an image processing system and the like that can reproduce colors more appropriately, a projector is provided with a calibration signal generation section that generates a calibration signal for a white image and calibration signals for three subtracted-primary-color images, each of which is obtained by subtracting a predetermined input value from the RGB values of a predetermined primary color, one of plurality of kinds of primary colors that together form white; an image projection section for displaying each calibration image, based on the corresponding calibration signal; a sensing section for sensing each displayed calibration image; a primary-color amount information generation section for calculating a difference between sensing signal values and calculating an image signal value for the highest output value of each of the RGB colors, based on that difference; an ambient-light amount information generation section for calculating an ambient-light amount based on differences between image signal values; and a correction information generation section for generating correction information for applying corrections, based on the highest output value for each of the RGB colors and the ambient-light amount.

6 Claims, 8 Drawing Sheets

FOREIGN PATENT DOCUMENTS

| | | |
|---|---|---|
| JP | A 10-093984 | 4/1998 |
| JP | A 2001-320725 | 11/2001 |
| JP | A 2002-072364 | 3/2002 |
| JP | A 2002-90880 | 3/2002 |
| JP | A 2002-140060 | 5/2002 |
| JP | A 2002-369227 | 12/2002 |
| JP | A 2003-108109 | 4/2003 |
| JP | A 2003-339056 | 11/2003 |
| JP | A 2004-163809 | 6/2004 |

* cited by examiner

IMAGE PROCESSING SYSTEM, PROJECTOR, STORAGE MEDIUM, AND IMAGE PROCESSING METHOD

This is a Continuation of application Ser. No. 11/372,262 filed Mar. 10, 2006 now U.S. Pat. No. 7,245,307, which in turn is a Divisional of application Ser. No. 10/843,530 filed May 12, 2004, now U.S. Pat. No. 7,061,506. The entire disclosures of the prior applications are hereby incorporated by reference herein in their entirety.

Japanese Patent Application No. 2003-138173, filed on May 16, 2003, and Japanese Patent Application No. 2003-150850, filed on May 28, 2003, are hereby incorporated by reference in their entirety.

BACKGROUND OF THE INVENTION

The present invention relates to an image processing system, a projector, a program, an information storage medium, and an image processing method.

When an image is displayed for a long time by an image display device such as a projector, color non-uniformity (including color non-uniformity due to luminance non-uniformity) are created in the image and the image gradually deteriorates.

This could happen when a projector is used to display an image continuously on a screen in a store or exhibition hall, for example. In such a case, the original display effect could be lost due to deterioration of components such as the liquid-crystal panel or a polarization plate during projection over a long period of time, which could generate color non-uniformity in the image.

A projector having a color non-uniformity correction means, such as that disclosed in Japanese Patent Application No. 2000-285933 (Japanese Patent Application Laid-Open No. 2002-90880) by way of example, is not configured for correcting color non-uniformity due to such time-related deterioration.

Causes of color non-uniformity due to time-related deterioration include the occurrence of light deficiencies due to time-related deterioration in a liquid-crystal light valve or polarization plate. The generation of a light deficiency could make an image that ought to be displayed as black appear to be blue.

If the projector projects an image in the R primary color in such a state, for example, there will be G and B color components within the R color so it is possible that the sensed data will be affected by colors other than R.

To remove the effects of ambient light such as artificial light, to ensure that the original way of viewing the desired image is reproduced, correction of the colors of the image is based on differential values between sensing information for a white monochromatic calibration image and sensing information for a black monochromatic calibration image.

However, if color non-uniformity occurs in the black monochromatic calibration image itself, it is possible that appropriate color correction cannot be applied because the above-described differential values are not accurate.

In addition, when an image is displayed in practice, the effects of ambient light such as artificial light or daylight can change the way in which the image is seen. Thus it is necessary to reduce the effects of ambient light by image processing, to ensure appropriate color reproduction of the image.

BRIEF SUMMARY OF THE INVENTION

The present invention was devised in light of the above-described technical problems. The present invention may prove an image processing system, a projector, a storage medium, and an image processing method that make it possible to reproduce image colors appropriately, by reducing the effects of ambient light and time-related deterioration, and, in particular, to provide an image processing system, a projector, a storage medium, and an image processing method that make it possible to reproduce image colors appropriately even when used for long periods of time.

To solve the above-described technical problems, according to one aspect of the present invention, there are provided an image processing system and a projector, each of which comprising:

calibration signal generation means for generating a calibration signal for displaying a first calibration image and a calibration signal for displaying a second calibration image, the second calibration image having the same proportion of a plurality of kinds of primary colors for determining color as the first calibration image, but of a different color from the first calibration image;

image display means for displaying the first and second calibration images at different time points, based on the calibration signals respectively;

sensing means for sensing each of the first and second calibration images which has been displayed and generating sensing signal values;

display color information generation means for calculating a third differential value between the sensing signal values for the first calibration image and the sensing signal values for the second calibration image, and generating an estimated sensing signal value for the first calibration image which is not affected by ambient light or an estimated sensing signal value for the second calibration image which is not affected by ambient light, based on the third differential value, a fourth differential value between an output value of the first calibration image and an output value of the second calibration image, and input-output characteristic information for the plurality of kinds of the primary colors;

ambient-light amount information generation means for calculating a fifth differential value between the sensing signal values for the first or second calibration image from the sensing means and the estimated sensing signal value for the first or second calibration image from the display color information generation means, and generating ambient-light amount information indicating an amount of ambient light based on the fifth differential value; and correction means for performing a predetermined correction on input image signals in order to display images in which effects of ambient light have been reduced, based on the ambient-light amount information, wherein the image display means displays images, based on image signals which have been corrected by the correction means.

According to another aspect of the present invention, there are provided an image generation system and a projector, each of which comprising:

a calibration signal generation section which generates a calibration signal for displaying a first calibration image and a calibration signal for displaying a second calibration image, the second calibration image having the same proportion of a plurality of kinds of primary colors for determining color as the first calibration image, but of a different color from the first calibration image;

an image display section which displays the first and second calibration images at different time points, based on the calibration signals respectively;

a sensing section which senses each of the first and second calibration images which has been displayed and generates sensing signal values;

a display color information generation section which calculates a third differential value between the sensing signal values for the first calibration image and the sensing signal values for the second calibration image, and generates an estimated sensing signal value for the first calibration image which is not affected by ambient light or an estimated sensing signal value for the second calibration image which is not affected by ambient light, based on the third differential value, a fourth differential value between an output value of the first calibration image and an output value of the second calibration image, and input-output characteristic information for the plurality of kinds of the primary colors;

an ambient-light amount information generation section which calculates a fifth differential value between the sensing signal values for the first or second calibration image from the sensing section and the estimated sensing signal value for the first or second calibration image from the display color information generation section, and generates ambient-light amount information indicating an amount of ambient light based on the fifth differential value; and a correction section which performs a predetermined correction on input image signals in order to display images in which effects of ambient light have been reduced, based on the ambient-light amount information, wherein the image display section displays images, based on image signals which have been corrected by the correction section.

According to still another aspect of the present invention, there is provided a storage medium storing a computer-readable program for causing a computer to function as:

a calibration signal generation section which generates a calibration signal for displaying a first calibration image and a calibration signal for displaying a second calibration image, the second calibration image having the same proportion of a plurality of kinds of primary colors for determining color as the first calibration image, but of a different color from the first calibration image;

an image display section which displays the first and second calibration images at different time points, based on the calibration signals respectively;

sensing section which senses each of the first and second calibration images which has been displayed and generates sensing signal values;

a display color information generation section which calculates a third differential value between the sensing signal values for the first calibration image and the sensing signal values for the second calibration image, and generates an estimated sensing signal value for the first calibration image which is not affected by ambient light or an estimated sensing signal value for the second calibration image which is not affected by ambient light, based on the third differential value, a fourth differential value between an output value of the first calibration image and an output value of the second calibration image, and input-output characteristic information for the plurality of kinds of the primary colors;

an ambient-light amount information generation section which calculates a fifth differential value between the sensing signal values for the first or second calibration image from the sensing section and the estimated sensing signal value for the first or second calibration image from the display color information generation section, and generates ambient-light amount information indicating an amount of ambient light based on the fifth differential value; and a correction section which performs a predetermined correction on input image signals in order to display images in which effects of ambient light have been reduced, based on the ambient-light amount information, wherein the image display section displays images, based on image signals which have been corrected by the correction section.

According to a still another aspect of the present invention, there is provided an image processing method comprising:

displaying a first calibration image;

sensing the first calibration image which has been displayed and generating a sensing signal value;

displaying a second calibration image having the same proportion of a plurality of kinds of primary colors for determining color as the first calibration image, but of a different color from the first calibration image;

sensing the second calibration image which has been displayed and generating a sensing signal value;

calculating a third differential value between the sensing signal value for the first calibration image and the sensing signal value for the second calibration image;

generating an estimated sensing signal value for the first calibration image which is not affected by ambient light or an estimated sensing signal value for the second calibration image which is not affected by ambient light, based on the third differential value, a fourth differential value between an output value of the first calibration image and an output value of the second calibration image, and input-output characteristic information for the plurality of kinds of the primary colors;

calculating a fifth differential value between the sensing signal value for the first or second calibration image and the estimated sensing signal value for the first or second calibration image, and generating ambient-light amount information indicating an amount of ambient light, based on the fifth differential value; and performing a predetermined correction on input image signals in order to display images in which effects of ambient light have been reduced, based on the ambient-light amount information.

The image processing system and the like can determine the amount of ambient light by using a non-black color calibration image. Therefore, the amount of ambient light can be obtained without any effects of color non-uniformity that cannot be corrected completely. The image processing system and the like can also reproduce image colors more appropriately by using that ambient-light amount to correct the image signals.

Note that the predetermined correction described above may be performed by correcting the input image signals directly, correcting the input image signals indirectly by updating information for correcting the input image signals (such as a look-up table, function, parameters, and the like), or the like, by way of example.

The image processing system and the projector may further comprise:

primary-color amount information generation means for calculating estimated sensing signal values of the highest output value of each kind of the primary colors which is not affected by ambient light, based on the estimated sensing signal values for the first or second calibration image from the display color information generation means, wherein the correction means may perform the predetermined correction on input image signals, based on the ambient-light amount information and the estimated sensing signal values of the highest output value of each kind of the primary colors.

The program may cause the computer to function as:

primary-color amount information generation section which calculates estimated sensing signal values of the highest output value of each kind of the primary colors which is not affected by ambient light, based on the estimated sensing signal values for the first or second calibration image from the display color information generation section, wherein the primary-color amount information generation section may perform the predetermined correction on input image signals, based on the ambient-light amount information and the estimated sensing signal values of the highest output value of each kind of the primary colors.

The image processing method may further comprise:

calculating estimated sensing signal values of the highest output value of each kind of the primary colors which is not affected by ambient light, based on the estimated sensing signal values for the first or second calibration image, wherein the predetermined correction on input image signals may be performed, based on the ambient-light amount information and the estimated sensing signal values of the highest output value of each kind of the primary colors.

With this configuration, since the image processing system and the like can perform a correction based on estimated sensing signal values for a plurality of kinds of primary colors, it enables more varieties of corrections in comparison with a case in which correction is based solely on ambient-light amount.

DETAILED DESCRIPTION OF THE EMBODIMENT

The application of the present invention to a projector having an image processing system is described below by way of example, with reference to the accompanying drawings. Note that the embodiments described below do not in any way limit the scope of the present invention as laid out herein. In addition, the entirety of the configuration described with reference to these embodiments is not limited to being essential structural components of the present invention.

First Embodiment

Figure 1:
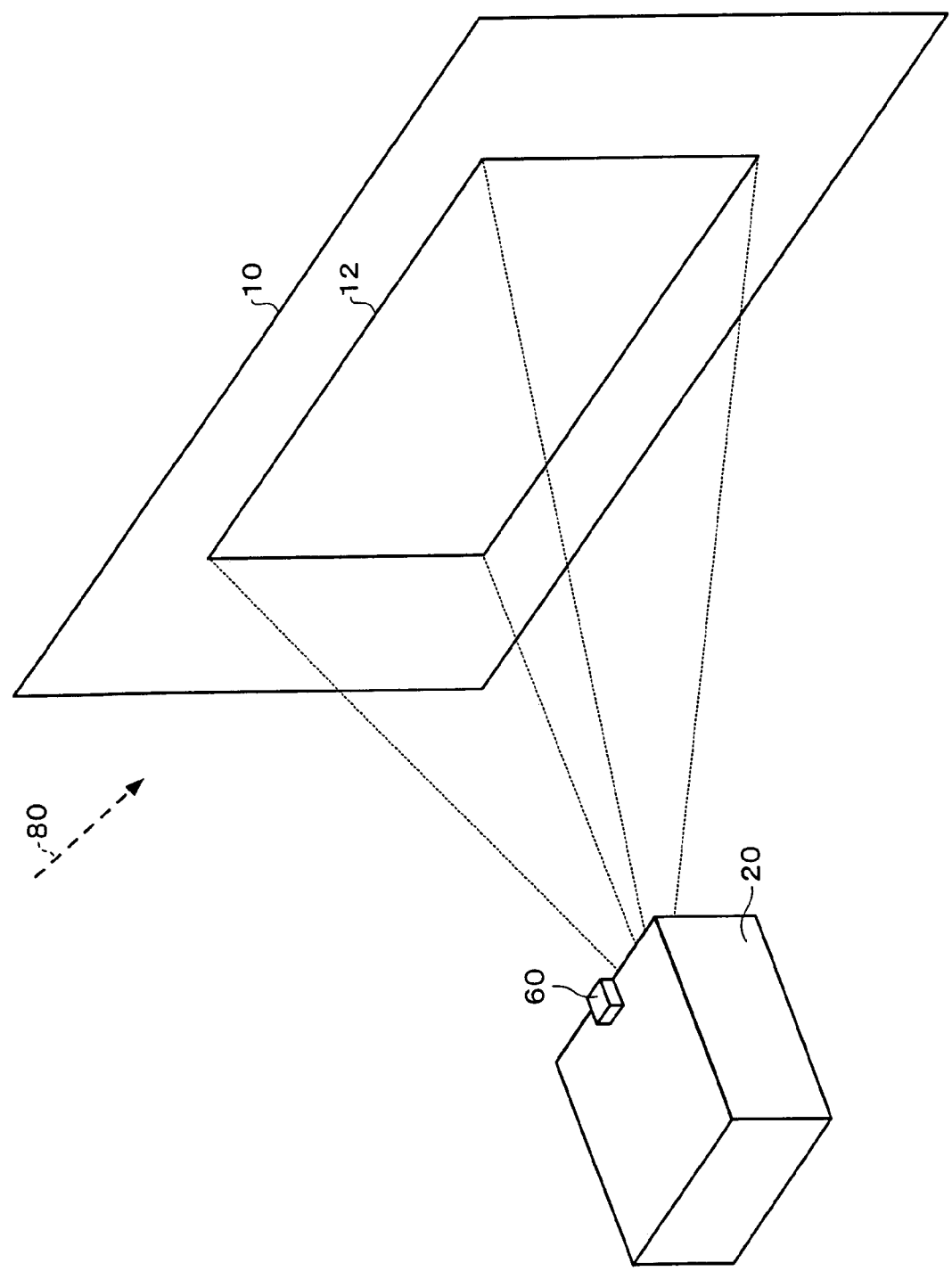
FIG. 1 is a schematic view of an image projection state in accordance with a first embodiment of the present invention.

A schematic view of the image projection state of a first embodiment of the present invention is shown in FIG. 1.

A projector 20 projects an image towards a screen 10. This causes the formation of a projection area 12 that is an image display area in the screen 10.

If an image display device such as the projector 20 is used for displaying an image for a long period of time, time-related deterioration in components such as the optical system will gradually generate color non-uniformity (including color non-uniformity due to luminance non-uniformity) in the image.

On top of that, the effects of ambient light 80 such as daylight or artificial lighting will change the way in which the image in the projection area 12 is seen. In other words, the way in which the image is seen is affected not only by time-related deterioration but also by the actual display state thereof.

To correct such color non-uniformity in the image, the projector 20 of this projector 20 is provided with a sensor 60 that is a sensing means. The sensor 60 senses an area that includes the projection area 12.

In this embodiment of the invention, the projector 20 projects a white calibration image and also three subtracted-primary-color calibration images, each of which is obtained by subtracting a predetermined input value from the RGB values of a predetermined primary color, one of plurality of kinds of primary colors that together form white.

The projector 20 uses the sensor 60 to sense each calibration image, then it determines the projection area from within the sensed image, based on sensing information (sensing signal values) that is output from the sensor 60. The projector 20 divides that projection area into a plurality of pixel blocks; calculates an average value of the image signal values of all the pixels within each block, for each block; calculates a correction amount for each pixel block based on the average value for that pixel block; and correct errors such as color non-uniformity of the image, based on those correction amounts.

In this manner, the projector 20 can use a calibration signal for displaying a white calibration image and three subtracted-primary-color calibration images, each of which is obtained by subtracting a predetermined input value from the RGB values of a predetermined primary color, one of plurality of kinds of primary colors that together form white, to perform processing such as color non-uniformity correction. It can use a calibration image of a non-black color to determine factors such as the amount of the ambient light. Therefore it can obtain the amount of the ambient light without being affected by color non-uniformity that cannot be corrected completely.

By using such ambient light amounts to correct the image signal, the projector 20 is able to reproduce the colors of an image more appropriately.

The description now turns to the functional blocks of the projector 20 that implement the above function.

Figure 2:
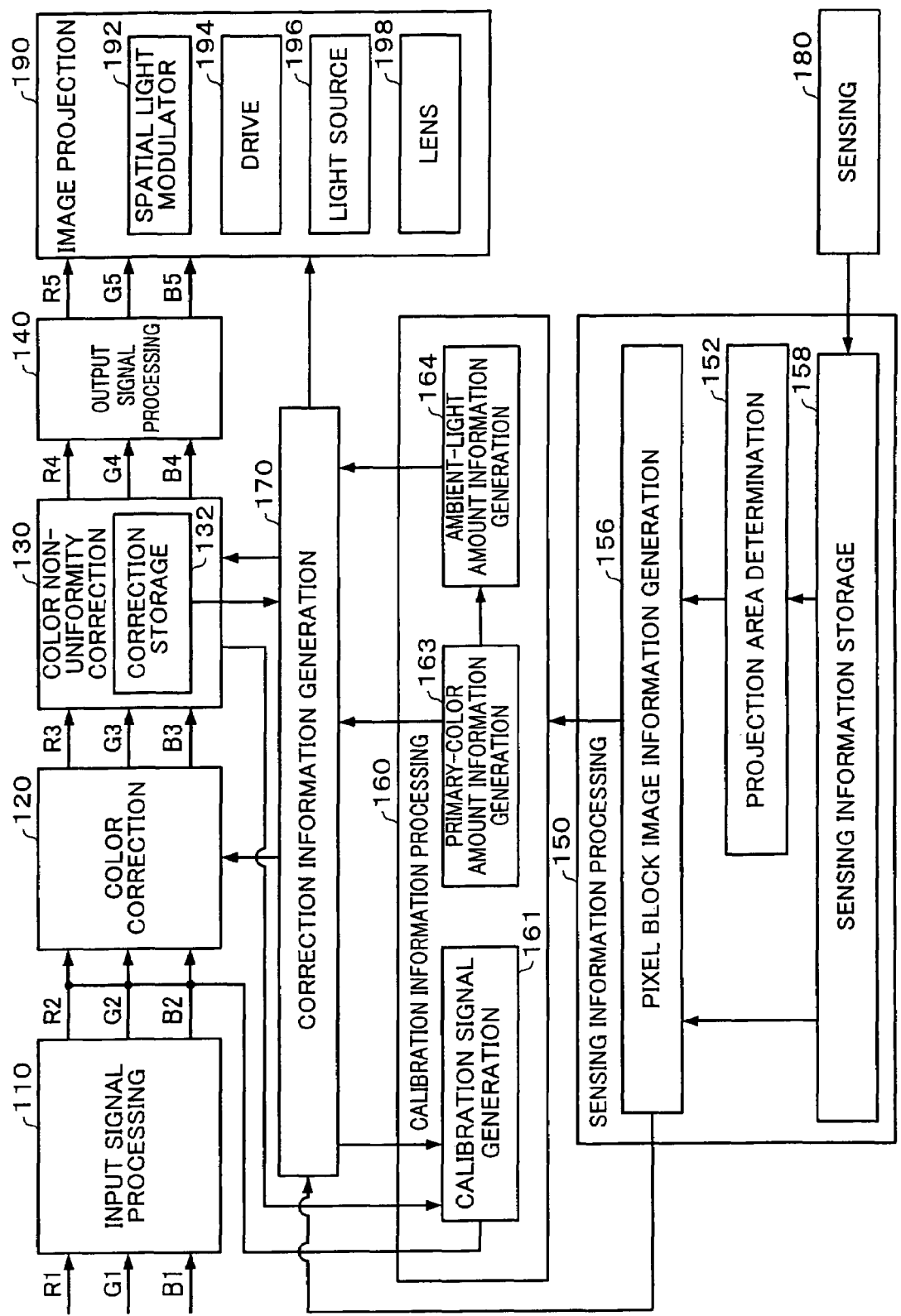
FIG. 2 is a functional block diagram of a projector of the first embodiment.

A functional block diagram of the projector 20 in accordance with the first embodiment is shown in FIG. 2.

The projector 20 comprises a sensing section 180 comprising the sensor 60, a sensing information processing section 150 that processes sensing information, a calibration information processing section 160 that processes calibration information, and a correction information generation section 170 that generates various types of correction information.

The sensing information processing section 150 comprises a sensing information storage section 158, a projection area determination section 152, and a pixel block image information generation section 156.

The calibration information processing section 160 comprises a calibration signal generation section 161 that generates a calibration signal for displaying the white calibration image and three subtracted-primary-color calibration images, each of which is obtained by subtracting a predetermined input value from the RGB values of a predetermined primary color, one of plurality of kinds of primary colors that together form white; a primary-color amount information generation section 163 that calculates the differences between a sensing signal value for the white calibration image and sensing signal values for the subtracted-primary-color calibration image, then calculates estimated sensing signal values for the highest RGB output values, based on those differences; and an ambient-light amount information generation section 164 for calculating the differences between the sensing signal value for the white calibration image and the estimated sensing signal values for the image of the highest output values, and generating ambient-light amount information indicating the amount of the ambient light, based on those differences.

The sensing information processing section 150 comprises the sensing information storage section 158 that stores the sensing signal values obtained by the sensing section 180, the projection area determination section 152 that determines the projection area (image display area) from a sensed image, and the pixel block image information generation section 156 that divides that projection area into a plurality of pixel blocks and also generates pixel block image information that indicates the average value of the image signal values for all the pixels making up each pixel block, based on predetermined calibration image sensing signal value.

Note that the sensing signal values and the image signal values could either be for the same type (for instance, the sensing signal values could be RGB values and the image signal value could also be RGB values) or the image signal values could be a conversion of the sensing signal values (for instance, the sensing signal values could be XYZ values whereas the image signal values are RGB values, by way of example). Note that XYZ refer to device-independent colors determined by the Commission Internationale de l'Eclairage (CIE).

The projector 20 also comprises the sensing section 180 that has the sensor 60 that senses the calibration images projected onto the screen 10.

The projector 20 further comprises an input signal processing section 110 that converts analog RGB signals (R1, G1, and B1) that are input from a PC or the like, into digital RGB signals (R2, G2, and B2); a color correction section 120 that performs color conversion or input-output conversion on those digital RGB signals (R2, G2, and B2) and outputs them as digital RGB signals (R3, G3, and B3); a color non-uniformity correction section 130 that corrects any color non-uniformity in those digital RGB signals (R3, G3, and B3) and outputs them as digital RGB signals (R4, G4, and B4); an output signal processing section 140 that converts those digital RGB signals (R4, G4, and B4) into analog RGB signals (R5, G5, and B5); and an image projection section 190 that is a type of image display means, that projects an image based on those analog RGB signals (R5, G5, and B5).

In addition, the projector 20 comprises correction means that performs predetermined corrections on the image signal, in order to display an image in which the effects of ambient light have been subtracted, based on the image signal values of the highest output value of each of the RGB colors and an ambient-light amount. The projector 20 comprises the color correction section 120, the color non-uniformity correction section 130, and the correction information generation section 170 as this correction means. The color non-uniformity correction section 130 comprises a correction storage section 132. Note that the highest output value in this case would be 255, if output values are represented by 8 bits.

The image projection section 190 comprises a spatial light modulator 192, a drive section 194 for driving the spatial light modulator 192, a light source 196, and a lens 198.

The drive section 194 drives the spatial light modulator 192, based on analog RGB signals from the output signal processing section 140. The image projection section 190 projects light from the light source 196 through the spatial light modulator 192 and the lens 198.

The hardware for implementing the above-described components of the projector 20 could be as described below.

Figure 3:
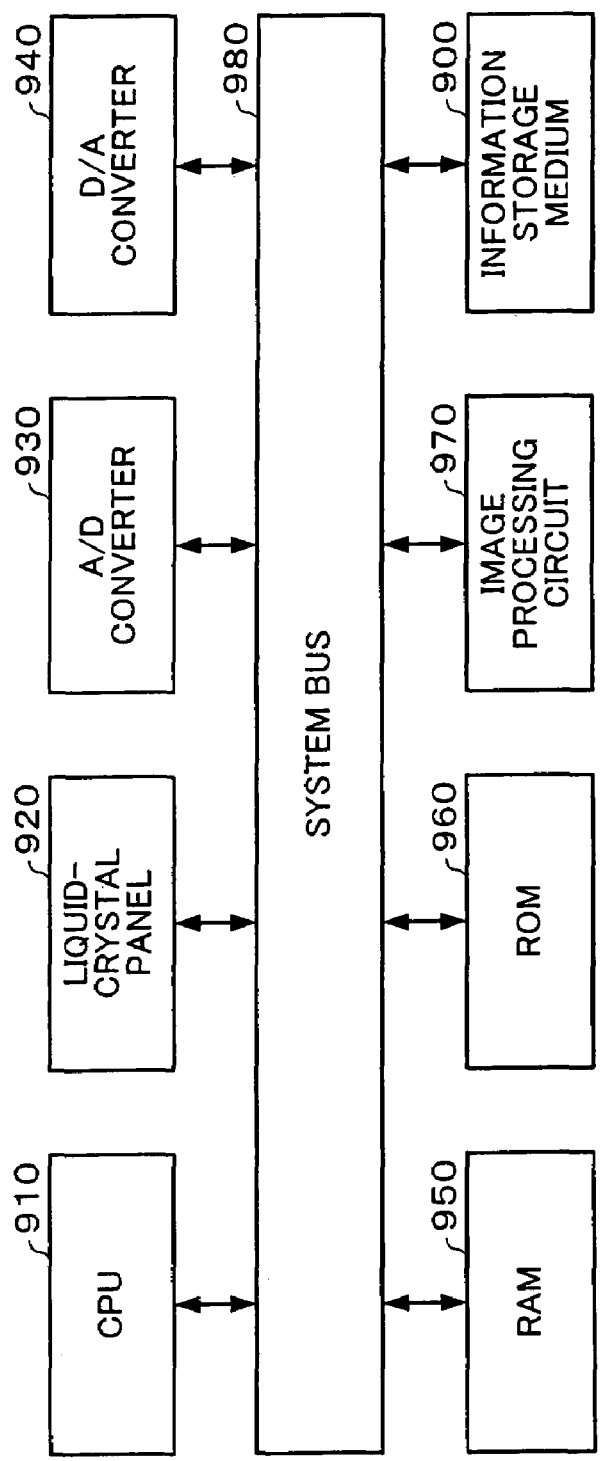
FIG. 3 is a hardware block diagram of the projector of the first embodiment.

A hardware block diagram of the projector 20 in accordance with the first embodiment is shown in FIG. 3.

For example, the configuration could be implemented by an A/D converter 930 or the like as the input signal processing section 110; RAM 950 or the like as the correction storage section 132 and the sensing information storage section 158; the CPU 910 and an image processing circuit 970 as the color non-uniformity correction section 130, the calibration signal generation section 161, the projection area determination section 152, the pixel block image information generation section 156, the primary-color amount information generation section 163, and the ambient-light amount information generation section 164; components such as the image processing circuit 970, RAM 950, and the CPU 910 as the correction information generation section 170; a D/A converter 940 or the like as the output signal processing section 140; a liquid-crystal panel 920 or the like as the spatial light modulator 192; and a ROM 960 in which is stored a liquid-crystal light valve driver for driving the liquid-crystal panel 920, as the drive section 194.

Note that these components can exchange information between themselves over a system bus 980.

In addition, these components could be implemented in a hardware manner by circuitry or in a software manner by drivers.

The calibration signal generation section 161 could also be implemented by reading from an information storage medium 900 a program that causes a computer to function as the calibration signal generation section 161, to cause the computer to function as the calibration signal generation section 161.

This information storage medium 900 could be a CD-ROM, DVD-ROM, ROM, RAM, or HDD, by way of example, and the method of reading the program therefrom could be a direct method or an indirect method.

Instead of the information storage medium 900, it is also possible to download a program that implements the above-described functions, from a host device through a transfer path, in order to implement the above-described functions.

The description now turns to the flow of image processing using these components.

Figure 4:
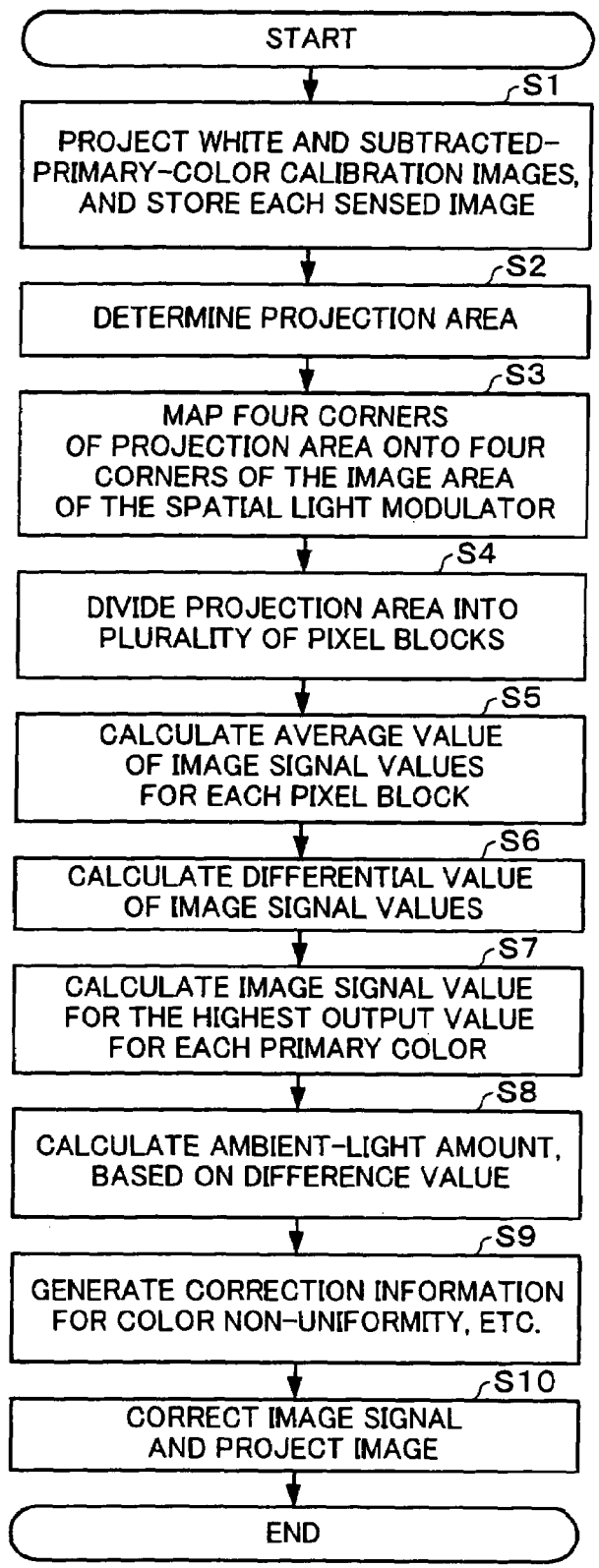
FIG. 4 is a flowchart of color non-uniformity correction processing in accordance with the first embodiment.

A flowchart of the flow of color non-uniformity correction processing in accordance with the first embodiment is shown in FIG. 4.

The calibration signal generation section 161 sequentially generates calibration signals for displaying a white calibration image and three subtracted-primary-color calibration images, each of which is obtained by subtracting a predetermined input value from the RGB values of a predetermined primary color, one of plurality of kinds of primary colors that together form white And the image projection section 190 projects those calibration images sequentially. Note that each of these calibration images consists of a single color (the entire image is the same color).

The sensing section 180 senses each calibration image on the screen 10 and generates a corresponding sensing signal value, and the sensing information storage section 158 stores the sensing signal value for each calibration image (step S1).

Note that the sensor 60 of this embodiment outputs an L-value (long-wavelength value or R-value), an M-value (medium-wavelength value or G-value), and an S-value (short-wavelength value or B-value) for each pixel of the sensor 60, as a sensing signal value. In such a case, an RGB sensor or the like could be used as the sensor 60.

Note that the screen 10 could be any type of screen, irrespective of color and material. It is also possible to have distortion of the image of the projection area 12. Of course, XYZ could also be used as the sensing signal values.

The projection area determination section 152 calculates a ratio of a sensing signal value (such as R-value, G-value, B-value, L-value, M-value, S-value, or illuminance value) for each pixel of the white calibration image and a sensing signal value for each pixel of the non-white calibration image that is mapped thereto, and determines the projection area from within the sensed image, based on the differences in ratio (step S2).

Note that the above-described ratio for pixels of the projection area is larger (such as at least 2) and the above-described ratio for pixels of the non-projection area is smaller (such as 1). This makes it possible for the projection area determination section 152 to determine the projection area from within the sensed image, based on the above-described ratios.

The pixel block image information generation section 156 maps the four corners of the projection area determined by the projection area determination section 152 onto the four corners of the image area of the spatial light modulator 192 (step S3).

The pixel block image information generation section 156 then divides the projection area of the sensed image into a c*d array of pixel blocks, based on information specifying this mapping (step S4). Note that c and d in this case can be any positive integers.

The pixel block image information generation section 156 calculates an average value of the image signal values (sensing signal values) for each pixel block, based on the thus-divided pixel blocks and the sensing signal values for the calibration image that are necessary for the primary-color amount information generation section 163 (step S5). Note that L-values, M-values, and S-values are used as image signal values and sensing signal values in this case.

The primary-color amount information generation section 163 then calculates differential values between the sensing signal value for the white calibration image and the sensing signal values for the subtracted-primary-color calibration images in which each of the R, G, and B primary colors is subtracted, for each pixel block (step S6).

Note that the RGB values for white are (255, 255, 255), comprising components of all the RGB primary colors. If the RGB values of an subtracted primary color (in which the R-color component has been subtracted from white) are (240, 255, 255), the differential value obtained by subtracting the measured value for that subtracted primary color from the measured value for white can be handled as a measured value for just the R-value component having RGB values of (15, 0, 0). Since each sensing signal value is affected by the external light 80, the differential value between two sensing single values will be a value that does not include the effect of the external light 80.

The primary-color amount information generation section 163 calculates the image signal value for the highest output value for each of the RGB colors (primary-color amount information), based on those differential values and input-output characteristic information for each of the primary colors (step S7). More specifically, since the input-output characteristic information can be expressed as a gamma curve, by way of example, the primary-color amount information generation section 163 obtains the image signal value for the case in which the highest output value for R-color is 255 by calculation from the relationship between the differential value for the case in which the output value for the R-color is 15 (in the above-described example) and the R-color gamma curve. The primary-color amount information generation section 163 can also obtain the image signal value for the highest output value for the G-color and the image signal value for the highest output value for the B-color in a similar manner, and, as a result, it can generate an image signal value for white that is not affected by ambient light, as the total value of the estimated sensing signal values for the highest output values for the primary colors.

The ambient-light amount information generation section 164 then calculates the difference between the sensing signal value for the white calibration image and the total of the estimated sensing signal values, and generates ambient-light amount information indicating the amount of ambient light, based on that differential value (step S8). In other words, since the sensing signal value for the white calibration image is affected by the ambient light and the difference between that and the total of the estimated sensing signal values is a sensing signal value for the white calibration image that is not affected by the ambient light, the ambient-light amount information generation section 164 can generate information on the effect of the ambient light alone, as ambient-light amount information, by calculating the difference between the two values.

The correction information generation section 170 generates correction information for performing predetermined corrections with respect to the image signal, for displaying an image in which the effects of ambient light have been subtracted, based on the ambient-light amount information (each of the LMS values) (step S9).

More specifically, to correct color non-uniformity, for example, the correction information generation section 170 determines the degree to which the external light 80 has an effect, based on the ambient-light amount information, generates color non-uniformity correction information in accordance with that degree of effect, and outputs it to the color non-uniformity correction section 130.

The color non-uniformity correction section 130 updates data for color non-uniformity correction (such as a one-dimensional look-up table for each of the R, G, and B primary colors), based on that color non-uniformity correction information, and uses that data for color non-uniformity correction to correct the input image signals (R3, G3, and B3).

The image projection section 190 projects the image, based on image signals that have been corrected for color non-uniformity by the color non-uniformity correction section 130 (step S10).

As described above, this embodiment makes it possible for the projector 20 to use a calibration image of a non-black color when determining the amount of ambient light. Therefore it can obtain the amount of the ambient light without the effects of color non-uniformity that cannot be corrected for completely. In other words, the present invention makes it possible for an image processing system and the like to use a calibration image of a non-black color to obtain the amount of ambient light, in stead of using a black calibration image that would be affected by color non-uniformity due to time-related deterioration Not only can the projector 20 reduce the effects of ambient light by correcting the input image signals in such a manner that the effects of ambient light are subtracted, based on that ambient-light amount, but it can also perform more appropriate reproduction of the colors of an image since it can also reduce the effects of time-related deterioration.

In addition, since the projector 20 can also use LMS values as sensing signal values, this makes it possible to correct color non-uniformity in a more simple and faster manner than with the use of XYZ values.

Second Embodiment

The description now turns to a method of obtaining the amount of ambient light without using a black calibration image, that differs from the method of the previous embodiment.

Figure 5:
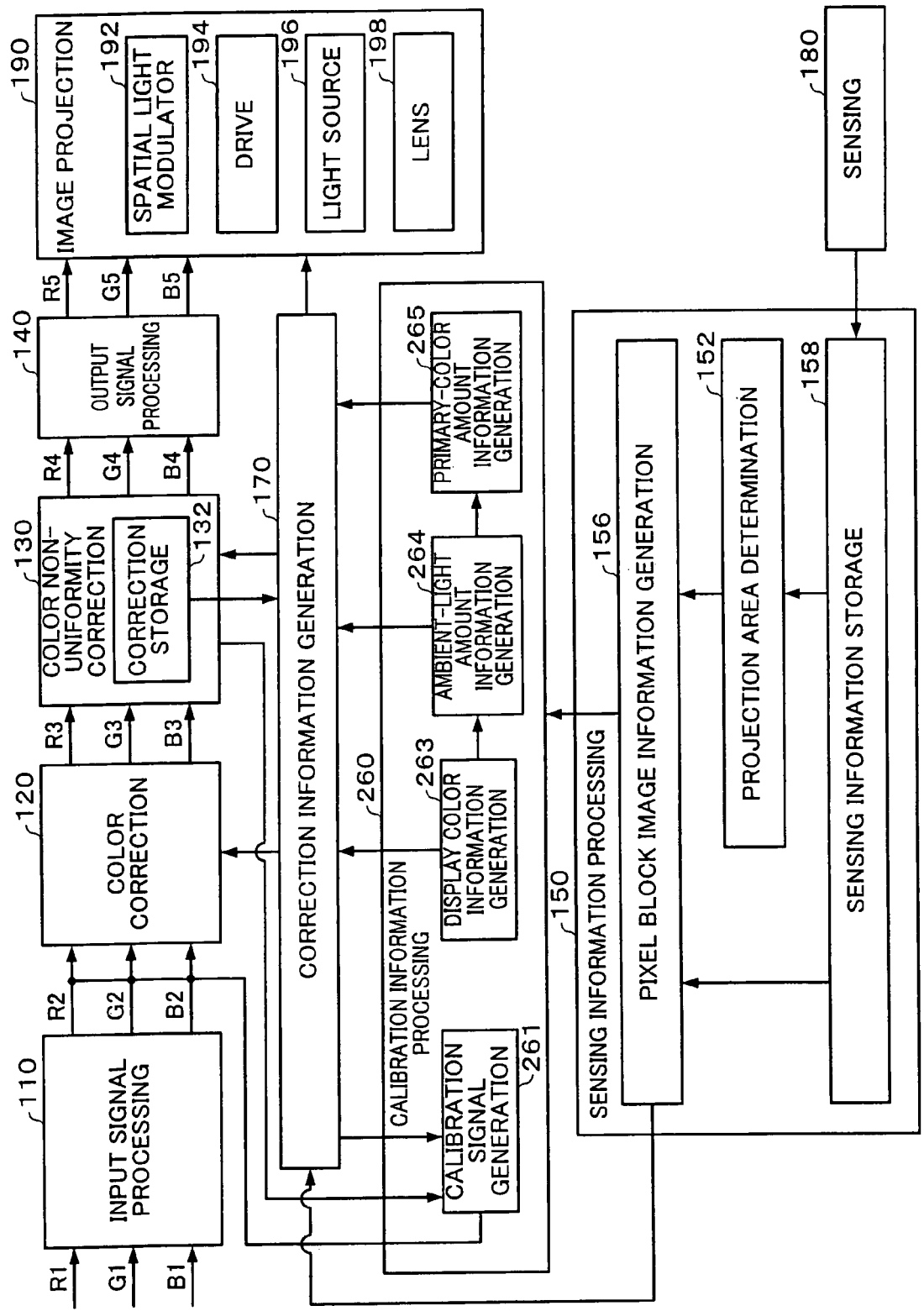
FIG. 5 is a functional block diagram of a projector in accordance with a second embodiment.

A functional block diagram of a projector in accordance with this second embodiment is shown in FIG. 5.

A calibration information processing section 260 within a projector of this embodiment comprises a calibration signal generation section 261 that generates a calibration signal for displaying a first calibration image and a calibration signal for displaying a second calibration image having RGB values in the same ratios as those of the first calibration image.

The calibration information processing section 260 also comprises a display color information generation section 263 that calculates a differential image signal value between a sensing signal value for the first calibration image and a sensing signal value for the second calibration image and also a differential output value between an output value for the first calibration image and an output value for the second calibration image, then generates an image signal value for the first calibration image that is not affected by ambient light (or an image signal value for the second calibration image that is not affected by ambient light), based on the differential image signal value, the differential output value, and input-output characteristic information.

Note that it is not necessary to calculate the above-described differential output value if a method is used whereby the above-described differential output value is stored in memory and the display color information generation section 263 reads that differential output value from memory.

The calibration information processing section 260 also comprises an ambient-light amount information generation section 264 that generates ambient-light amount information indicating the amount of ambient light, by calculating the difference between an image signal value from the sensing information storage section 158 for the first calibration image (or second calibration image) that is affected by ambient light and an image signal value from the display color information generation section for the first or second calibration image that is not affected by ambient light, and a primary-color amount information generation section 265 that calculates an image signal value for the highest output value for each of the RGB colors, based on an image signal value from the display color information generation section 263 for the first or second calibration image that is not affected by ambient light.

The description now turns to the flow of color non-uniformity correction processing, using these components.

Figure 6:
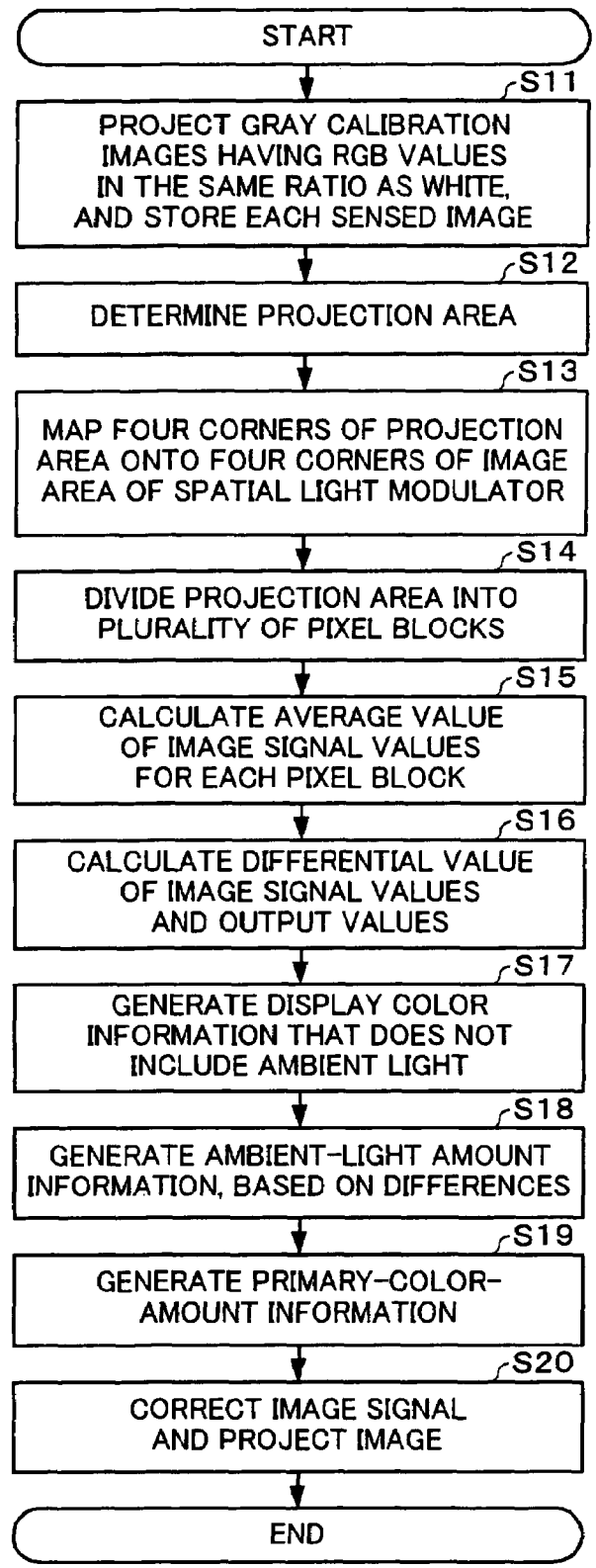
FIG. 6 is a flowchart of color non-uniformity correction processing in accordance with the second embodiment.

A flowchart of the flow of color non-uniformity correction processing in accordance with the second embodiment is shown in FIG. 6.

The processing up until the generation of pixel block image information is substantially the same as that described with reference to FIG. 4. However, the sensing information storage section 158 stores a sensing signal value of a first calibration image (such as a white calibration image having RGB values of (255, 255, 255)) and a sensing signal value of a second calibration image having RGB values in the same ratio as those of the first calibration image (such as a gray-color calibration image having RGB values of (250, 250, 250)) (step S11). Note that in this embodiment, the screen 10 is preferably a uniform white.

The projector determines the projection area (step S12), maps it (step S13), divides it into pixel blocks (step S14), and calculates an average value of image signal values for each pixel block (step S15).

The display color information generation section 263 calculates a differential signal value between the sensing signal value for the first calibration image and the sensing signal value for the second calibration image and a differential output value (such as 5 in the above-described example) between the output value of the first calibration image (such as 255 in the above-described example) and output value of the second calibration image (such as 250 in the above-described example) (step S16). Note that if the output value of each calibration image is fixed, information indicating differential output values could be stored beforehand in memory and the display color information generation section 263 uses that information on differential output values that has been stored in memory.

The display color information generation section 263 generates estimated sensing signal values (such as LMS values) for the first calibration image (or the second calibration image) that are not affected by ambient light, based on the differential image signal value, the differential output value, and input-output characteristic information (step S17).

The ambient-light amount information generation section 264 generates ambient-light amount information by subtracting the LMS values (estimated sensing signal values) for a predetermined pixel block that are not affected by ambient light, which were obtained by the display color information generation section 263, from the LMS values (sensing signal values) for that block that are affected by ambient light, from the pixel block image information generation section 156 (step S18).

The primary-color amount information generation section 265 calculates the image signal value for the highest output value for each of the RGB colors, in other words, the primary-color amounts that are not affected by ambient light, based on one value (such as the M-value) of the LMS values (estimated sensing signal values) for the first or second calibration image that are not affected by the ambient light and a one-dimensional look-up table or the like that generates the primary-color amounts from the display color information generation section 263 (step S19).

The subsequent processing using the primary-color amount and ambient-light amount has been described previously with reference to FIG. 4. The image projection section 190 projects an image, based on an image signal that has been corrected by the ambient-light amount information (step S20).

This method also makes it possible for the projector 20 to apply appropriate correction of faults such as color non-uniformity in the image, without using black.

Third Embodiment

The description now turns to an embodiment in which the correction of color non-uniformity is based on the light-deficiency amount of primary colors.

In this embodiment, the projector 20 projects a monochromatic calibration image (one in which the entire image is a uniform color) in the Y-family colors, the M-family colors, and the C-family colors. Note that, in this case, Y-family colors are colors that have RGB values of (255, 255, m), M-family colors are colors that have RGB values of (255, m, 255) and C-family colors have RGB values of (m, 255, 255). In this case, m is any integer from 0 to 255, when colors are represented as 8-bit values, by way of example.

While projecting these images, the projector 20 increments the value of m sequentially from 0 by a predetermined amount (such as from 1 to 32), where m is the B-value for the Y-family colors, by way of example. It does the same for the M-family colors and B-family colors too. It should go without saying that the projector 20 could decrement m sequentially from 255 by a predetermined amount, or it could vary m irregularly.

Note that the Y-color and the B-color, the M-color and the G-color, and the C-color and the R-color are each in a complementary color relationship. In this case, complementary colors are colors that will produce no color when mixed in an appropriate proportion. In other words, in this embodiment, the projector 20 projects calibration images, each formed by varying the value of the color (B, G, or R) that is complementary to each of the Y-family colors, and M-family colors, and the C-family colors.

The projector 20 uses the sensor 60 to sense each of the calibration images; determines the projection area from within each sensed image, based on that sensing information; divides that projection area into a plurality of pixel blocks; calculates a characteristic value (such as an average value) of the image signal values for all the pixels in each pixel block; calculates a correction amount for each pixel block, based on those characteristic values and generates correction amount information indicating the amount of corrections; and corrects faults such as color non-uniformity in the image, based on that correction amount information.

By using a calibration image of Y-family colors that have RGB values of (255, 255, m) in this manner, the projector 20 is able to determine just the light deficiency for the B-color, excluding any effect of light deficiency for the R-color and G-color. It does the same for the M-color and the C-color.

Since the projector 20 also generates light-deficiency amount information indicating the light-deficiency amounts for the R-color, G-color, and B-color; generates primary-color-light amount information indicating the amount of each primary color light, based on that light-deficiency amount information; and generates correction amount information indicating the amount of corrections for color non-uniformity, based on that primary-color-light amount information; it can reduce the effects of light deficiencies and thus correct for color non-uniformity in a more appropriate manner.

The description now turns to the functional blocks of the projector 20 that implement the above function.

Figure 7:
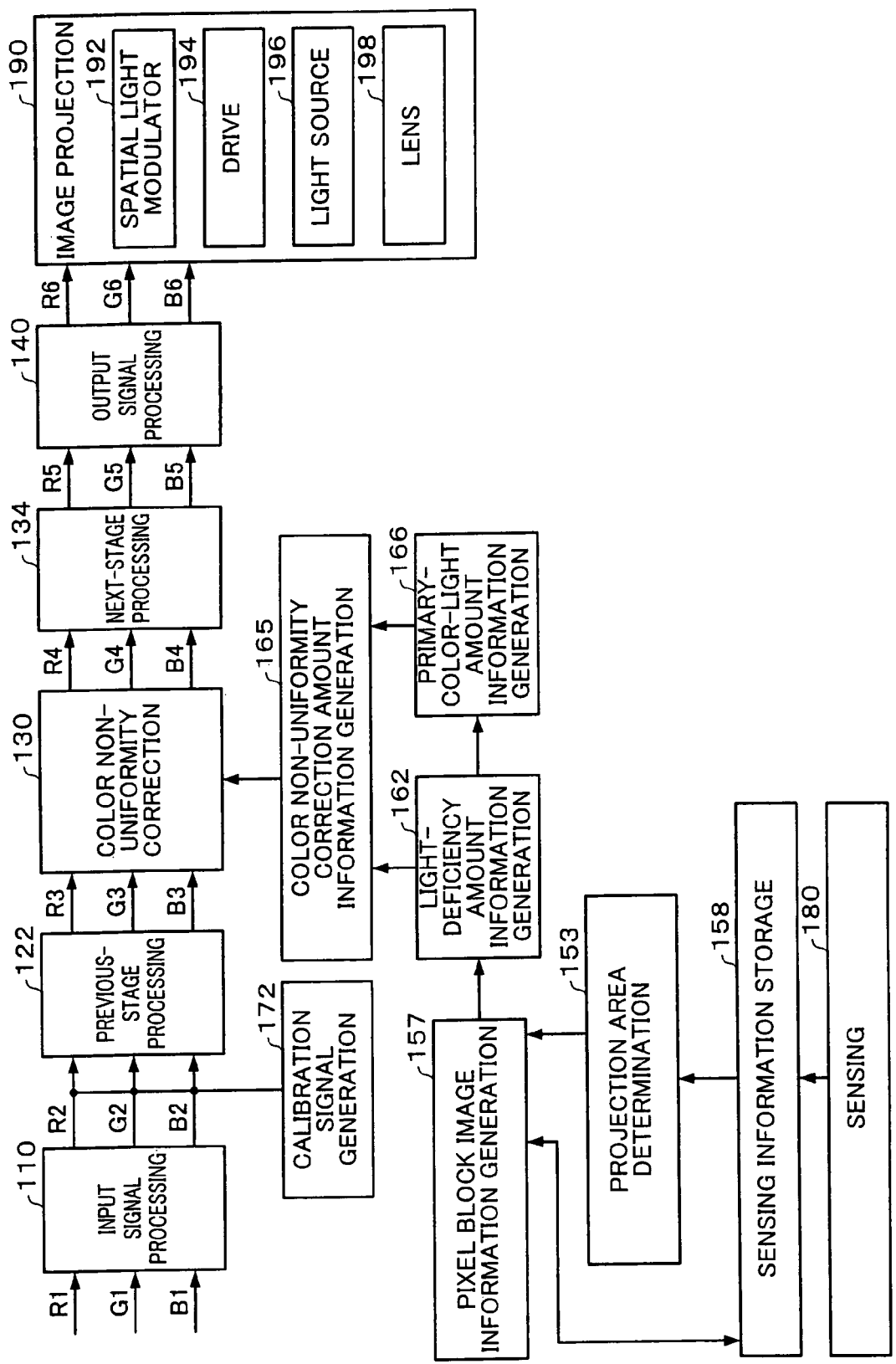
FIG. 7 is a functional block diagram of a projector in accordance with a third embodiment.

A functional block diagram of the projector 20 in accordance with a third embodiment of the present invention is shown in FIG. 7.

The projector 20 comprises a calibration signal generation section 172 that generates calibration signals for three calibration images in the Y-family colors, M-family colors, and C-family colors, in which the B-value for Y-family colors, the G-value for M-family colors, and the R-value for C-family colors is increased in steps of a predetermined amount from 0 to the maximum value 255; the image projection section 190 that functions as an image display means for displaying each calibration image at different time points, based on those calibration signals; and the sensing section 180 that senses the thus-displayed calibration images and generates sensing information. Note that the sensing section 180 comprises the sensor 60.

The projector 20 also comprises the sensing information storage section 158 that stores the sensing information from the sensing section 180, a projection area determination section 153 that determines the projection area (image display area) from within each sensed image, and a pixel block image information generation section 157 that divides that projection area into a plurality of pixel blocks and also generates pixel block image information indicating the average value of image signal values for the pixels making up each pixel block, based on the sensing information for the predetermined calibration images.

The projector 20 further comprises a light-deficiency amount information generation section 162 that generates information such as degree of light-deficiency effect information and light-deficiency amount information indicating the degree to which the light deficiency for each of the R, G, and B colors has an effect on each pixel block, based on that pixel block image information; and a primary-color-light amount information generation section 166 that generates primary-color-light amount information indicating the amounts of primary-color light with no light deficiencies for the R, G, and B colors in each pixel block, based on the degree of light-deficiency effect information and the pixel block image information.

The projector 20 still further comprises a color non-uniformity correction amount information generation section 165 that generates correction amount information indicating the amount of correction for the data for color non-uniformity correction, based on the primary-color-light amount information and the light-deficiency amount information; and the color non-uniformity correction section 130 that corrects the data for color non-uniformity correction, based on that correction amount information, and corrects the color non-uniformity of the image, based on the corrected data for color non-uniformity correction.

The projector 20 yet further comprises the input signal processing section 110 that converts analog RGB signals (R1, G1, and B1) that are input from a PC or the like, into digital RGB signals (R2, G2, and B2), and a previous-stage processing section 122 that outputs digital RGB signals (R3, G3, and B3) that are those digital RGB signals (R2, G2, and B2) after being subjected to color conversion or input-output conversion, to the color non-uniformity correction section 130.

The projector 20 again further comprises a next-stage processing section 134 that outputs digital RGB signals (R5, G5, and B5) that are the digital RGB signals (R4, G4, and B4) corrected by the color non-uniformity correction section 130, after correction for adjusting the input-output characteristic of the spatial light modulator 192; and the output signal processing section 140 that outputs analog RGB signals (R6, G6, and B6) that have been converted from the digital RGB signals (R5, G5, and B5), to the image projection section 190.

The image projection section 190 comprises the spatial light modulator 192, the drive section 194 that drives the spatial light modulator 192, the light source 196, and the lens 198.

The drive section 194 drives the spatial light modulator 192, based on analog RGB signals from the output signal processing section 140. The image projection section 190 projects light from the light source 196 through the spatial light modulator 192 and the lens 198.

The hardware for implementing the above-described components of the projector 20 could be as described below.

For example, the configuration could be implemented by an A/D converter 930 or the like as the input signal processing section 110; RAM 950 or the like as the sensing information storage section 158; the image processing circuit 970 or the like as the color non-uniformity correction section 130, the calibration signal generation section 172, the projection area determination section 153, the pixel block image information generation section 157, the light-deficiency amount information generation section 162, and the primary-color-light amount information generation section 166; the CPU 910 or the like as the color non-uniformity correction amount information generation section 165; the image processing circuit 970, the RAM 950, and the CPU 910 as the previous-stage processing section 122; the image processing circuit 970, the RAM 950, and the CPU 910 as the next-stage processing section 134; the D/A converter 940 or the like as the output signal processing section 140; the liquid-crystal panel 920 or the like as the spatial light modulator 192; and ROM 960 or the like in which is stored a liquid crystal light valve drive driver for driving the liquid-crystal panel 920 as the drive section 194.

Note that these components can exchange information between themselves over a system bus 980.

In addition, these components could be implemented in a hardware manner by circuitry or in a software manner by drivers.

The calibration signal generation section 172 could also be implemented by reading from an information storage medium 900 a program that causes a computer to function as the calibration signal generation section 172, to cause the computer to function as the calibration signal generation section 172.

The information storage medium 900 could be a CD-ROM, DVD-ROM, ROM, RAM, or HDD, by way of example, and the method of reading the program therefrom could be a direct method or an indirect method.

Instead of the information storage medium 900, it is also possible to download a program that implements the above-described functions, from a host device through a transfer path, in order to install the above-described functions.

The description now turns to the flow of image processing using these components.

Figure 8:
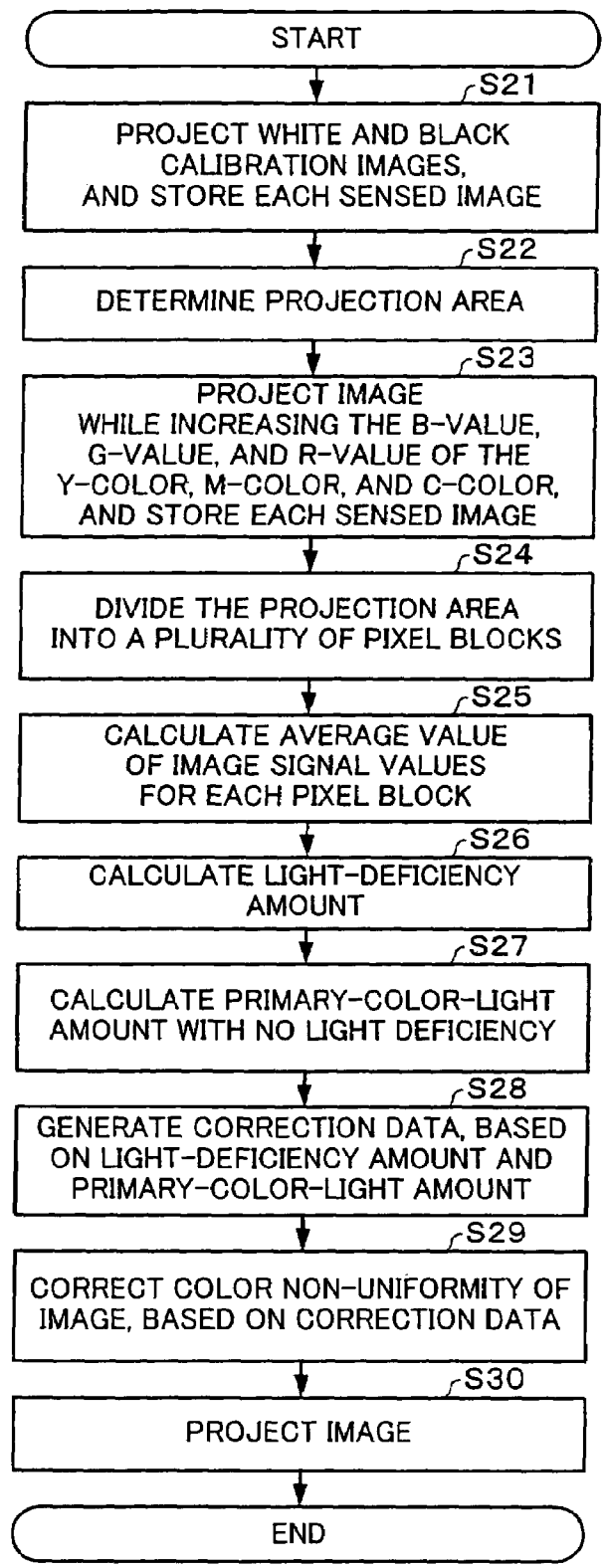
FIG. 8 is a flowchart of color non-uniformity correction processing in accordance with the third embodiment.

A flowchart of the flow of color non-uniformity correction processing in accordance with this third embodiment is shown in FIG. 8.

First of all, the calibration signal generation section 172 generates calibration signals for displaying monochromatic white-color (W) and black-color (K) calibration images, the image projection section 190 projects the W-color and K-color towards the screen 10, and the sensing section 180 senses each of the area comprising the projection area 12 on which the W-color has been projected and the area comprising the projection area 12 on which the K-color has been projected.

Note that the screen 10 could be any type of screen, irrespective of color and material. It is also possible to have distortion of the image of the projection area.

The calibration signal for the W-color calibration image is the same as a calibration signal in which the m-value for each of the Y-family colors, M-family colors, and C-family colors has been set to the maximum value. The sensing section 180 could be configured to sense the screen 10 when nothing is projected thereon, without generating a calibration signal for a K-color calibration image.

The sensing information storage section 158 stores the sensing information for each of the W-color and the K-color from the sensing section 180 (step S21). Note that as L-value (a long-wavelength value or R-value), an M-value (a medium-wavelength value or G-value), and an S-value (a short-wavelength value or B-value) are used as this sensing information. Of course it is also possible to use XYZ values or the like as the sensing information.

The projection area determination section 153 calculates the ratio of an image signal value (such as R-value, G-value, B-value, L-value, M-value, S-value, or illuminance value) for each pixel of the captured W-color image and an image signal value for each pixel of the captured K-color image that maps onto that pixel, and determines the projection area from within the sensed image from the differences of those ratios (step S22).

Note that the above-described ratio for pixels of the projection area is larger (such as at least 2) and the above-described ratio for pixels of the non-projection area is smaller (such as 1). This makes it possible for the projection area determination section 153 to determine the projection area from within the sensed image, based on the above-described ratios.

The calibration signal generation section 172 generates a calibration signal in which the B-value of the Y-color increments by a predetermined amount (such as 1) from 0 to 255. The image projection section 190 projects these calibration images sequentially, the sensing section 180 senses each calibration image, and the sensing information storage section 158 stores sensing information.

The calibration signal generation section 172 generates calibration signals in which the G-value of the M-color and the R-value of the C-color increments by the predetermined amount. The sensing information storage section 158 stores the sensing information in each case, in a similar manner (step S23).

The pixel block image information generation section 157 then maps the four corners of the projection area determined by the projection area determination section 153 onto the four corners of the image area of the spatial light modulator 192. The pixel block image information generation section 157 then divides the projection area of the sensed image into a c*d array of pixel blocks, based on information specifying this mapping (step S24). Note that c and d in this case can be any positive integers.

The pixel block image information generation section 157 calculates an average value of the image signal values for each pixel block, based on the thus-ivided pixel blocks and the sensing information for the calibration image that are necessary for the light-deficiency amount information generation section 162 (step S25). Note that L-values, M-values, and S-values are used as image signal values in this case. Note also that the average value is a type of characteristic value for each pixel block.

The light-deficiency amount information generation section 162 then calculates the degree of light-deficiency effect and light-deficiency amount for a predetermined output value for the primary colors (R-color, G-color, and B-color), based on the average value of L-values, the average value of M-values, and the average value of S-values for each pixel block of the predetermined calibration image from the pixel block image information generation section 157 (step S26), to generate degree of light-deficiency effect information and light-deficiency amount information.

More specifically, to generate the degree of light-deficiency effect information, the light-deficiency amount information generation section 162 calculates $C_{LYb}(n)$, which is one form of degree of light-deficiency effect information, based on a ratio such as a first numerical formula $(L_W(n)/L_{Yb}(n)):(L_W(n_{max})/L_{Yb}(n_{max}))=C_{LYb}(n):1$.

Note that $L_W(n)$ in this case is an average L-value that is a first characteristic value during W-color capture of pixel block n, and $L_{Yb}(n)$ is an average L-value that is a second characteristic value during the capture of Y-family colors in which the B-value for pixel block n has increased by b output values. In addition, $n_{max}$ is the pixel block position at which the ratio of the first characteristic value to the second characteristic value is a maximum. Note that it goes without saying that $n_{max}$ could be the pixel block position at which the ratio of the second characteristic value to the first characteristic value is a minimum, or the pixel block position at which the difference between the first characteristic value and the second characteristic value is a maximum.

In this case, $C_{LYb}(n)$ is a numerical value indicating the effects of B-color light-deficiency on pixel block n during the capture of Y-family colors where the B-value is b, and is a form of degree of light-deficiency effect information. The smaller the value of $C_{LYb}(n)$, the larger the effect of the light deficiency, with a state in which there is no effect due to light deficiency being indicated by 1.

The light-deficiency amount information generation section 162 performs similar calculations for the M-value and S-value, to obtain $C_{MYb}(n)$ and $C_{SYb}(n)$, which are degree of light-deficiency effect information, for each pixel block. The light-deficiency amount information generation section 162 also generates degree of light-deficiency effect information represented by L-values, M-values, and S-values for each of the R-color and the G-color too.

When generating the light-deficiency amount information, the light-deficiency amount information generation section 162 bases the generation of the light-deficiency amount information on the above-described first numerical formula. More specifically, when it generates ? $L_{Yb}(n)$ that is a form of light-deficiency amount information indicating the light-deficiency amount for the B-color with value b in pixel block n as an L-value, the light-deficiency amount information generation section 162 uses the formula ? $L_{Yb}(n)=L_{Yb}(n)-C_{LYb}(n)L_{Yb}(n)=(1-C_{LYb}(n))*L_{Yb}(n)$ to generate an L-value for the light-deficiency amount information indicating the light-deficiency amount for the B-color.

Similarly, the light-deficiency amount information generation section 162 generates ? $M_{Yb}(n)$ indicating the B-color light-deficiency amount as an M-value and ? $S_{Yb}(n)$ indicating the B-color light-deficiency amount as an S-value. Furthermore, the light-deficiency amount information generation section 162 also generates light-deficiency amount information for the R-color and the G-color, represented by L-values, M-values, and S-values.

The light-deficiency amount information generation section 162 can generate the degree of light-deficiency effect information and the light-deficiency amount information by the above sequence.

The light-deficiency amount information generation section 162 outputs the Y-color, M-color and C-color pixel block image information and the R-color, G-color and B-color degree of light-deficiency effect information to the primary-color-light amount information generation section 166, and outputs the R-color, G-color and B-color light-deficiency amount information to the color non-uniformity correction amount information generation section 165.

The primary-color-light amount information generation section 166 calculates the maximum output estimated values for the R-color, G-color, and B-color, in other words, the primary-color-light amount that has no light deficiencies, based on the Y-color, M-color and C-color pixel block image information and the R-color, G-color and B-color degree of light-deficiency effect information from the light-deficiency amount information generation section 162 (step S27), to generate the primary-color-light amount information.

More specifically, since there is no light deficiency if $C_{LY0}(n)$ indicating the degree of light-deficiency effect is 1 for the L-value of pixel block n of the Y-color (output value b=0) sensed image, there is no light deficiency if $L_{Y0}(n)$ is equal to $C_{LY0}(n)*L_{Y0}(n)$.

Conversely, if $C_{LY0}(n)$ is not 1, this means that there is some light deficiency and the value of $C_{LY0}(n)*L_{Y0}(n)$, obtained by multiplying the $L_{Y0}(n)$ value that comprises a light deficiency by $C_{LY0}(n)$ that is the degree of effect of the light-deficiency, becomes the L-value for pixel block n of the Y-color (output value b=0) sensed image without light-deficiency.

The maximum output estimated values for the B-color that has RGB values of (0, 0, 255) are obtained by subtracting the measured values for the Y-color, having RGB values of (255, 255, 0), from the measured values for the W-color, having RGB values of (255, 255, 255).

The maximum output estimated value $LMAX_B(n)$ for the B-color at the projector 20 is therefore: $L_W(n)-C_{LY0}(n)*L_{Y0}(n)$. In a similar manner, $MMAX_B(n)$ and $SMAX_B(n)$ are obtained for the M-value and the S-value. The R-color and the G-color are handled in a similar manner.

In this manner, the primary-color-light amount information generation section 166 generates primary-color-light amount information represented as LMS values (such as $LMAX_B(n)$) for the R-color, G-color, and B-color for each pixel block, and outputs that primary-color-light amount information to the color non-uniformity correction amount information generation section 165.

The color non-uniformity correction amount information generation section 165 calculates what proportion the light-deficiency amount is of the maximum output estimated value (primary-color-light amount) for the R-color, G-color, and B-color for each pixel block, based on the light-deficiency amount information from the light-deficiency amount information generation section 162 and the primary-color-light amount information from the primary-color-light amount information generation section 166.

More specifically, $P_{Bb}(n)$ indicating the proportion with respect to the maximum output estimated value for the B-color light deficiency in pixel block n with value b in the Y-family colors is obtained as: $AVR\{? L_{Yb}(n)/LMAX_B(n), ? M_{Yb}(n)/MMAX_B(n), ? S_{Yb}(n)/SMAX_B(n)\}$. Note that AVR in this case is a function that outputs the average value of the values in the parentheses. The R-color proportion $P_{Rr}(n)$ and the G-color proportion $P_{Gg}(n)$ are obtained in a similar manner.

The color non-uniformity correction amount information generation section 165 generates correction data that indicates the color non-uniformity correction amount (step S28). More specifically, the color non-uniformity correction amount information generation section 165 generates the correction data by the method described below.

The previous-stage processing section 122 uses a conversion function f that employs a one-dimensional look-up table, by way of example, to convert image signal values S2 (R2, G2, and B2) into an image signal value S3(n). Note that S3(n)=R3(n), G3(n), and B3(n). If this conversion function is f, S3=f(S2).

The color non-uniformity correction section 130 has a one-dimensional look-up table for each pixel block and each of the RGB colors, by way of example. In such a case, the color non-uniformity correction section 130 uses the one-dimensional look-up table for pixel block n to convert the image signal value S3(n) into S4(n). Note that S4(n)=R4(n), G4(n), and B4(n). If this conversion function is h, S4(n)= h{S3(n)}.

The next-stage processing section 134 has a one-dimensional look-up table for adjusting the input-output characteristic of the spatial light modulation element, by way of example. If the conversion function of the next-stage processing section 134 is j, S5=j(S4). Note that S5=R5, G5, and B5.

In combination, the output from the next-stage processing section 134 becomes S5=j{h[f(S2)]}.

The color non-uniformity correction amount information generation section 165 generates color non-uniformity correction amount information in such a manner that the output decreases proportionally with respect to the maximum output estimated value of the light deficiency.

As described above, for the image block n, with Y-family colors having a B-value of b, the proportion with respect to the maximum output estimated value of the light deficiency of the B-color is $P_{Bb}(n)$. In this case, $B5'_b(n)$ that is the B-value that the next-stage processing section 134 ought to output is the value obtained by subtracting the light-deficiency amount from the original B-value $B5_b(n)$. In other words, $B5'_b(n)=B5_b(n)-B5_{max}*P_{Bb}(n)$. This is a second numerical formula.

Note that in this case, $B5_b(n)$ is the value of the image signal value B5 for the image block n when the B-value of Y-family colors is b, and $B5_{max}$ is the value of the image signal value B5 when the B-value of the Y-family colors is the value 255.

If the color non-uniformity correction amount at the color non-uniformity correction section 130 is assumed to be C, the value that the color non-uniformity correction section 130 outputs to the next-stage processing section 134 is S4'(n) which is S4(n) after color non-uniformity correction where: S4'(n)=h[f(B2)]−C.

In this case, the B-value $B5'_b(n)$ that ought to be output by the next-stage processing section 134 is: $B5'_b(n)=j\{S4'(n)\}$. Rearranging this numerical formula gives: $B5'_b(n)=j\{h[f(B2)]-C\}$. This is a third numerical formula.

The following identity is derived from the second numerical formula and the third numerical formula:

$$B5_b(n)-B5_{max}*P_{Bb}(n)=j\{h[f(B2)]-C\}$$

The color non-uniformity correction amount C is therefore given by $C=h[f(B2)]-j^{-1}\{B5_b(n)-B5_{max}*P_{Bb}(n)\}$ when $B5_b(n)$ is greater than or equal to $B5_{max}*P_{Bb}(n)$, and $C=h[f(B2)]$ when $B5_b(n)$ is less than $B5_{max}*P_{Bb}(n)$.

The color non-uniformity correction amount information generation section 165 calculates the color non-uniformity correction amount C for each pixel block, each of the RGB colors, and also each of predetermined output values in the above described sequence, and generates color non-uniformity correction amount information that indicates this color non-uniformity correction amount C for output to the color non-uniformity correction section 130.

The color non-uniformity correction section 130 updates the data for color non-uniformity correction, based on that color non-uniformity correction amount information, and corrects the color non-uniformity of the image, based on the data for color non-uniformity correction (step S29).

More specifically, the color non-uniformity correction section 130 calculates h[f(S2)]−C based on the color non-uniformity correction amount C, and updates the data for color non-uniformity correction (such as the one-dimensional look-up table for each of the R-color, G-color, and B-color).

The color non-uniformity correction section 130 converts the image signals (R3, G3, and B3) into image signals (R4, G4, and B4) for correcting color non-uniformity of the image, based on the data for color non-uniformity correction that was updated for correcting the color non-uniformity.

The next-stage processing section 134 generates image signals (R5, G5, and B5) that have had the input-output characteristic adjusted, based on those image signals (R4, G4, and B4). The output signal processing section 140 converts those digital image signals (R5, G5, and B5) into analog image signals (R6, G6, and B6).

The image projection section 190 projects an image, based on the image signals (R6, G6, and B6) that have been corrected for color non-uniformity and have had input-output characteristic adjustment (step S30).

As described above, this embodiment makes it possible for the projector 20 to determine the amount of light deficiencies in each of the primary colors (R-color, G-color, and B-color) without being affected by other colors, by using calibration images that reference the Y-color, M-color, and C-color.

Since the projector 20 can obtain each primary-color-light amount and then obtain a correction amount for color non-uniformity from that primary-color-light amount, it can reduce the effects of light deficiencies and correct the color non-uniformity more appropriately.

Since the projector 20 can also correct for faults such as color non-uniformity due to time-related deterioration, it can suppress any deterioration in image quality, even when the image is projected continuously for a long time, such as in an exhibition hall, in particular. This enables a reduction in the frequency of repair or the replacement of optical components of the projector 20 due to time-related deterioration, enabling use of the projector 20 for extended periods of time.

This embodiment also makes it possible for the projector 20 to reference pixel blocks with the smallest amount of effect of light deficiencies, by using pixel blocks in which the ratios of image signal values (such as L-values, M-values, and S-value) are a maximum.

The projector 20 can also determine the degree of light deficiency generated for other pixel blocks, by comparing the image signal value for a pixel block in which the above ratio is a maximum and the image signal value for other pixel blocks. This makes it possible for the projector 20 to determine the light-deficiency amount as appropriate, enabling appropriate correction of color non-uniformity.

In particular, during the calculations, the projector 20 could remove the effects of the color of the screen 10 and perform color non-uniformity correction irrespective of the projection angle of the projector 20, by using the ratio of the image signal value when the white calibration image is sensed with no light deficiency and the image signal value when a calibration image of the C-color, for example, is sensed.

During the calculations, the primary-color-light amount information generation section 166 could assume that the primary-color light does not comprise any color non-uniformity due to a light deficiency, even under a state in which color non-uniformity has occurred due to a light deficiency, by using image information for the pixel block at which the ratio of the output value for a Y-color calibration image where b has 0 output value for a M-color calibration image where g has 0 output value for a C-color calibration image where r has 0 output value to the output value for a white calibration image is a maximum.

Since the projector 20 can also use LMS values as sensing information, it can correct color non-uniformity in a simpler and more rapid manner than with XYZ values.

VARIANT EXAMPLES

The present invention was described above with respect to preferred embodiments thereof, but the applications of the present invention are not limited to those embodiments For example, the above-described embodiment was described as relating to reducing the effects of usage state, such as the external light 80, but the time-related deterioration of the optical system in the spatial light modulator 192 and other components depend on usage time, not usage state.

Therefore, the projector 20 can equally well perform correction to reduce the effects of time-related deterioration in the optical system beforehand, and correction history information indicating whether or not to such correction has been performed could be stored in the correction storage section 132.

The projector 20 could perform correction to reduce the effects of the external light 80 when the above-described correction is performed, based on the correction history information stored in the correction storage section 132, or perform correction with respect to deterioration of the optical system and correction to reduce the effects of the external light 80, if the above-described correction is not performed.

Not only does this make it possible for the projector 20 to reduce the effects due to time-related deterioration, it also enables a shortening of correction time at the time at which it is used in practice.

The embodiment above was described with reference to the application of color non-uniformity correction by way of example, but the present invention is also valid for color correction (hue and brightness corrections) and image distortion correction based on differences in color and brightness in the projection area 12.

RGB colors were used as the primary colors in the above embodiment, but other color systems such as XYZ or CMY could also be used therefor.

In the above embodiment, an average value was used as a characteristic value, but it would also be possible to use the image signal value for a pixel at the center of each pixel block, a maximum value, a minimum value, or the largest frequency value in a histogram, by way of example.

The numerical formulae used above were used as examples, and are not to be taken as placing limits on the numerical formulae used to obtain the operational effects of the present invention.

The embodiments described above related to examples in which an image processing system is mounted in the projector 20, but the image processing system could equally well be mounted in an image display device other than the projector 20, such as a cathode ray tube (CRT). A projector such as a digital micromirror device (DMD) could also be used as the projector 20, other than a liquid-crystal projector. Note that DMD is a trademark registered to Texas Instruments Inc. of the USA.

The functions of the above-described the projector 20 could be implemented by the projector alone, by way of example, or they could be implemented by distributing them between a plurality of processing devices (such as between the projector and a PC).

The invention claimed is:

1. An image processing system comprising:
   calibration signal generation means for generating a calibration signal for displaying a first calibration image and a calibration signal for displaying a second calibration image, the second calibration image having the same proportion of a plurality of kinds of primary colors for determining color as the first calibration image, but of a different color from the first calibration image;
   image display means for displaying the first and second calibration images at different time points, based on the calibration signals respectively;
   sensing means for sensing each of the first and second calibration images which has been displayed and generating sensing signal values;
   display color information generation means for calculating a third differential value between the sensing signal values for the first calibration image and the sensing signal values for the second calibration image, and generating an estimated sensing signal value for the first calibration image which is not affected by ambient light or an estimated sensing signal value for the second calibration image which is not affected by ambient light, based on the third differential value, a fourth differential value between an output value of the first calibration image and an output value of the second calibration image, and input-output characteristic information for the plurality of kinds of the primary colors;
   ambient-light amount information generation means for calculating a fifth differential value between the sensing signal values for the first or second calibration image from the sensing means and the estimated sensing signal value for the first or second calibration image from the display color information generation means, and generating ambient-light amount information indicating an amount of ambient light based on the fifth differential value; and
   correction means for performing a predetermined correction on input image signals in order to display images in which effects of ambient light have been reduced, based on the ambient-light amount information,
   the image display means displaying images, based on image signals which have been corrected by the correction means.

2. The image processing system as defined in claim 1, further comprising:
   primary-color amount information generation means for calculating estimated sensing signal values of the highest output value of each kind of the primary colors which is not affected by ambient light, based on the estimated sensing signal values for the first or second calibration image from the display color information generation means,
   the correction means performing the predetermined correction on input image signals, based on the ambient-light amount information and the estimated sensing signal values of the highest output value of each kind of the primary colors.

3. An image processing system comprising:
   a calibration signal generation section which generates a calibration signal for displaying a first calibration image and a calibration signal for displaying a second calibration image, the second calibration image having the same proportion of a plurality of kinds of primary colors for determining color as the first calibration image, but of a different color from the first calibration image;
   an image display section which displays the first and second calibration images at different time points, based on the calibration signals respectively;
   a sensing section which senses each of the first and second calibration images which has been displayed and generates sensing signal values;
   a display color information generation section which calculates a third differential value between the sensing signal values for the first calibration image and the sensing signal values for the second calibration image, and generates an estimated sensing signal value for the first calibration image which is not affected by ambient light or an estimated sensing signal value for the second calibration image which is not affected by ambient light, based on the third differential value, a fourth differential value between an output value of the first calibration image and an output value of the second calibration image, and input-output characteristic information for the plurality of kinds of the primary colors;

an ambient-light amount information generation section which calculates a fifth differential value between the sensing signal values for the first or second calibration image from the sensing section and the estimated sensing signal value for the first or second calibration image from the display color information generation section, and generates ambient-light amount information indicating an amount of ambient light based on the fifth differential value; and a correction section which performs a predetermined correction on input image signals in order to display images in which effects of ambient light have been reduced, based on the ambient-light amount information, wherein the image display section displays images, based on image signals which have been corrected by the correction section.

4. A projector comprising the image processing system as defined in claim 1.

5. A storage medium storing a computer-readable program for causing a computer to function as:

a calibration signal generation section which generates a calibration signal for displaying a first calibration image and a calibration signal for displaying a second calibration image, the second calibration image having the same proportion of a plurality of kinds of primary colors for determining color as the first calibration image, but of a different color from the first calibration image;

an image display section which displays the first and second calibration images at different time points, based on the calibration signals respectively;

a sensing section which senses each of the first and second calibration images which has been displayed and generates sensing signal values;

a display color information generation section which calculates a third differential value between the sensing signal values for the first calibration image and the sensing signal values for the second calibration image, and generates an estimated sensing signal value for the first calibration image which is not affected by ambient light or an estimated sensing signal value for the second calibration image which is not affected by ambient light, based on the third differential value, a fourth differential value between an output value of the first calibration image and an output value of the second calibration image, and input-output characteristic information for the plurality of kinds of the primary colors;

an ambient-light amount information generation section which calculates a fifth differential value between the sensing signal values for the first or second calibration image from the sensing section and the estimated sensing signal value for the first or second calibration image from the display color information generation section, and generates ambient-light amount information indicating an amount of ambient light based on the fifth differential value; and a correction section which performs a predetermined correction on input image signals in order to display images in which effects of ambient light have been reduced, based on the ambient-light amount information, the image display section displaying images, based on image signals which have been corrected by the correction section.

6. An image processing method comprising:

displaying a first calibration image;

sensing the first calibration image which has been displayed and generating a sensing signal value;

displaying a second calibration image having the same proportion of a plurality of kinds of primary colors for determining color as the first calibration image, but of a different color from the first calibration image;

sensing the second calibration image which has been displayed and generating a sensing signal value;

calculating a third differential value between the sensing signal value for the first calibration image and the sensing signal value for the second calibration image;

generating an estimated sensing signal value for the first calibration image which is not affected by ambient light or an estimated sensing signal value for the second calibration image which is not affected by ambient light, based on the third differential value, a fourth differential value between an output value of the first calibration image and an output value of the second calibration image, and input-output characteristic information for the plurality of kinds of the primary colors;

calculating a fifth differential value between the sensing signal value for the first or second calibration image and the estimated sensing signal value for the first or second calibration image, and generating ambient-light amount information indicating an amount of ambient light, based on the fifth differential value; and performing a predetermined correction on input image signals in order to display images in which effects of ambient light have been reduced, based on the ambient-light amount information.

\* \* \* \* \*